United States Patent
Menke

(10) Patent No.: US 8,991,361 B2
(45) Date of Patent: Mar. 31, 2015

(54) METHOD FOR OPERATING A HYBRID MOTOR VEHICLE WITH FORCED START AND FILTER REGENERATION PROMPTLY AFTER EACH REFUELING

(75) Inventor: Andreas Menke, Tiefenbronn-Lehningen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 593 days.

(21) Appl. No.: 13/279,719

(22) Filed: Oct. 24, 2011

(65) Prior Publication Data

US 2012/0116652 A1  May 10, 2012

(30) Foreign Application Priority Data

Nov. 9, 2010 (DE) .......... 10 2010 060 455

(51) Int. Cl.
*F02M 33/02* (2006.01)
*F02D 28/00* (2006.01)
*B60K 15/035* (2006.01)
*B60W 10/06* (2006.01)
*B60W 20/00* (2006.01)
*B60W 30/192* (2012.01)

(52) U.S. Cl.
CPC .......... *F02D 28/00* (2013.01); *B60K 15/03504* (2013.01); *B60W 10/06* (2013.01); *B60W 20/00* (2013.01); *B60W 30/192* (2013.01); *B60W 2560/02* (2013.01); *Y02T 10/54* (2013.01)
USPC .......................................... 123/520; 701/103

(58) Field of Classification Search
CPC ............ F02M 25/089; F02M 25/0809; F02M 25/0818; F02M 25/0854; F02M 25/08; B60K 15/03504; B60K 2015/03514; B60W 2560/02; B60W 20/1086
USPC ........ 123/516, 518, 519, 520, 198 D, 179.16, 123/179.4; 137/43, 493, 587–589; 73/114.39; 701/101, 103
See application file for complete search history.

(56) References Cited

U.S. PATENT DOCUMENTS 6,557,534 B2 * 5/2003 Robichaux et al. ........... 123/520
7,775,195 B2 * 8/2010 Schondorf et al. ............ 123/520
(Continued)

FOREIGN PATENT DOCUMENTS

DE  10 2007 002 188   7/2008
JP         7253058       10/1995
(Continued)

*Primary Examiner* — Erick Solis
*Assistant Examiner* — Carl Staubach
(74) *Attorney, Agent, or Firm* — Gerald E. Hespos; Michael J. Porco; Matthew T. Hespos

(57) ABSTRACT

A method is provided for operating a motor vehicle having an internal combustion engine (2) that is supplied with fuel from a fuel tank (7), and having a regeneratable filter device (6) for taking up fuel vapors from the fuel tank (7). To improve properties of fuel vapor retaining systems during operation of motor vehicles, the method includes carrying out a forced start of the internal combustion engine (2) promptly after a refueling process in order to regenerate the filter device (6).

10 Claims, 1 Drawing Sheet

(56) References Cited

U.S. PATENT DOCUMENTS

| | | | |
|---|---|---|---|
| 7,866,424 B2 * | 1/2011 | Sauvlet et al. | 180/65.21 |
| 8,181,631 B2 * | 5/2012 | Bohr et al. | 123/520 |
| 8,215,291 B2 * | 7/2012 | DeBastos et al. | 123/521 |
| 8,483,934 B2 * | 7/2013 | Cunningham et al. | 701/103 |
| 8,612,081 B2 * | 12/2013 | Konishi | 701/22 |
| 2003/0150417 A1 * | 8/2003 | Miwa | 123/179.4 |
| 2009/0084363 A1 * | 4/2009 | Reddy | 123/520 |
| 2013/0211641 A1 * | 8/2013 | Fujii | 701/22 |
| 2013/0274977 A1 * | 10/2013 | Fushiki | 701/22 |

FOREIGN PATENT DOCUMENTS

| | | |
|---|---|---|
| JP | 2007210536 | 8/2007 |
| JP | 2010096025 | 4/2010 |

* cited by examiner

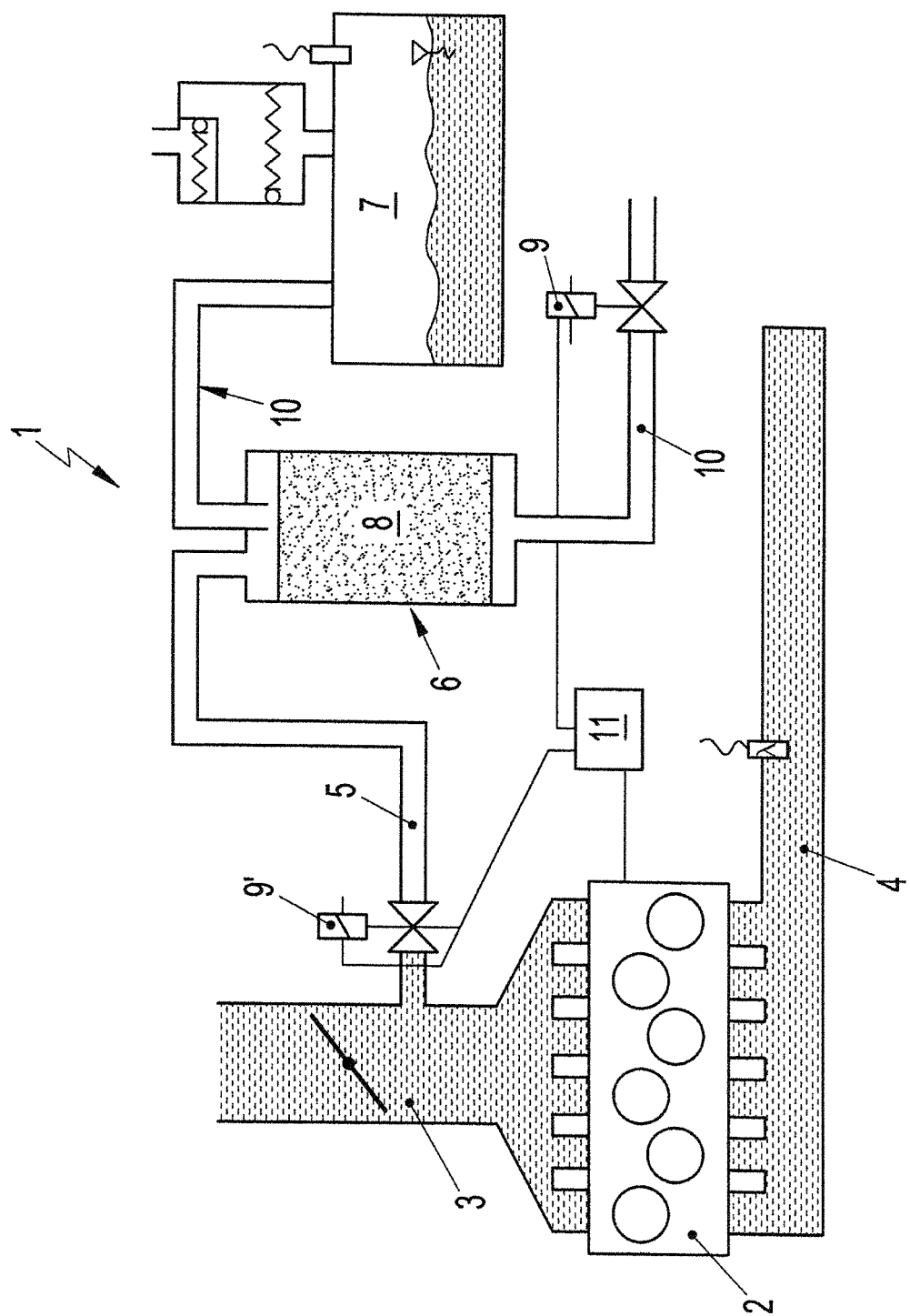

METHOD FOR OPERATING A HYBRID MOTOR VEHICLE WITH FORCED START AND FILTER REGENERATION PROMPTLY AFTER EACH REFUELING

CROSS REFERENCE TO RELATED APPLICATION

This application claims priority under 35 USC 119 to German Patent Application No 10 2010 060 455.0 filed on Nov. 9, 2010, the entire disclosure of which is incorporated herein by reference.

BACKGROUND OF THE INVENTION

1. Field of the Invention

The invention relates to a method for operating a motor vehicle with an internal combustion engine that is supplied with fuel from a fuel tank, and having a regeneratable filter device for taking up fuel vapors from the fuel tank.

2. Description of the Related Art

German laid-open patent application DE 10 2007 002 188 A1 discloses various measures for improving properties of fuel vapor retaining systems during the operation of a hybrid vehicle that has an internal combustion engine and a filter device for taking up fuel vapors. These measures include activating the internal combustion engine as a function of a charge state of the filter device.

The object of the invention is to improve the properties of fuel vapor retaining systems during the operation of motor vehicles, in particular during the operation of hybrid vehicles or vehicles with a start/stop device.

SUMMARY OF THE INVENTION

The invention relates to a method for operating a motor vehicle with an internal combustion engine that is supplied with fuel from a fuel tank, and having a regeneratable filter device for taking up fuel vapors from the fuel tank. In accordance with the invention, a forced start of the internal combustion engine is carried out to regenerate the filter device promptly after refueling. The filter device may comprise an activated carbon filter that adsorbs hydrocarbon vapors in a charge phase and desorbs those hydrocarbon vapors in a regeneration phase by scavenging with fresh air. The fuel vapors that are bound into the activated carbon filter are fed to the internal combustion engine and burned, thereby emptying the activated carbon filter. According to the invention, the internal combustion is started after refueling even though starting is not necessary for operating the vehicle or for scavenging a saturated activated carbon filter. The forced starting of the internal combustion engine after a refueling process ensures that the filter device is scavenged.

The forced start of the internal combustion engine in accordance with the invention preferably is carried out even when the motor vehicle is driven in some other way without the internal combustion engine, for example in a purely electric mode. The motor vehicle is preferably a hybrid vehicle that has a further drive motor, such as an electric motor, in addition to the internal combustion engine. The further drive motor can drive the motor vehicle independently of the internal combustion engine.

The forced start of the internal combustion engine may be carried out even when the fuel tank is not completely filled during refueling. This ensures that the filter device is scavenged even when it is not yet full.

The forced start of the internal combustion engine preferably is carried out after a refueling process has been detected and is initiated directly after or shortly after the refueling process.

The method preferably comprises monitoring a closure of the fuel tank to detect an end of a refueling process and to trigger the forced start of the internal combustion engine. The tank closure can comprise a tank valve whose open state is monitored.

The method of the invention may further comprise monitoring a filling level sensor signal to detect a refueling process and to trigger the forced start of the internal combustion engine. The filling level of the fuel tank can be monitored with a filling level sensor that outputs a filling level sensor signal.

The method of the invention may further comprise carrying out an additional forced start of the internal combustion engine at fixed time intervals and/or as a function of the state of the filter device to regenerate the filter device. The state of the filter device can be monitored using a sensor device that can detect, for example, a hydrocarbon concentration and/or a pressure in the fuel tank.

The method of the invention may further comprise activating a scavenging pump and/or a venturi nozzle to improve the scavenging effect and to speed up the scavenging process when there is a forced start of the internal combustion engine.

The method of the invention preferably is carried out in a hybrid vehicle, a plug-in hybrid vehicle and/or a motor vehicle having a start/stop device. The hybrid vehicle preferably includes an internal combustion engine and an electric machine. A hybrid vehicle that can be charged using an electrical plug-type connection to an electric supply network is referred to as a plug-in hybrid vehicle. The start/stop device starts the motor vehicle automatically, for example after starting at traffic lights, if, for example, a clutch of the motor vehicle is activated.

The method of the invention preferably is carried out using a pressurized fuel tank. The term pressurized tank refers, for example, to a fuel tank that is shut off during operation of the motor vehicle in a pressure-tight or vapor-tight fashion.

Further advantages, features and details of the invention emerge from the following description in which various exemplary embodiments are described in detail with reference to the drawing.

BRIEF DESCRIPTION OF THE DRAWING

FIG. 1 illustrates a tank venting system of a motor vehicle that can be operated according to the inventive method.

DETAILED DESCRIPTION OF THE PREFERRED EMBODIMENT

A hybrid drive for a hybrid vehicle (not illustrated otherwise) is identified generally by the numeral 1 in FIG. 1. The hybrid drive 1 includes an internal combustion engine 2 and an electric motor (not illustrated). The hybrid vehicle preferably is a full hybrid vehicle that can be operated both in a purely internal-combustion-engine mode as well as a purely electric-motor mode.

The internal combustion engine 2 has an intake section 3 and is connected to an exhaust system 4. The intake section 3 feeds a fuel/air mixture to the internal combustion engine 2, and the fuel/air mixture is burned in the internal combustion engine 2. The combustion products leave the internal combustion engine 2 and pass into the surroundings via the exhaust system 4.

A suction line 5 has a first end connected to a filter device 6 and a second end that opens into the intake section 3. The suction line 5 and the filter device 6 are components of a tank venting system that also comprises a fuel tank 7. The filter device 6 has a regeneratable or a scavengable filter material 8 and is arranged in a tank venting line 10 that leads into the surroundings from the fuel tank 7 and can be shut off by of a valve device 9. A further valve device 9 is arranged in the suction line 5 between the intake section 3 of the internal combustion engine 2 and the filter device 6.

The hydrocarbons which evaporate from the fuel pass via the tank venting line 10 into the filter device 6 and are prevented from escaping into the surroundings there by the filter material 8, for example an activated carbon filter. Scavenging or regeneration of the filter material 8 is necessary if the filter material 8 is saturated with hydrocarbons. Accordingly, a control device 11 is provided and opens the valve device 9, 9' when necessary to feed ambient air to the intake section 3 through the filter material 8 and the suction line 5. As a result of the scavenging of ambient air through the tank venting line 10 and the filter material 8, the filter material 8 is regenerated and is prepared for the renewed taking up of hydrocarbons that have evaporated out of the fuel.

Operating states occur in a hybrid drive 1 in which the internal combustion engine 2 is switched off and the motor vehicle is driven in a purely electric motor mode. In this operating state, the filter device 6 cannot be scavenged due to the lack of a pressure gradient from the intake section 3 to the filter device 6. As a result, there is the risk of the filter material 8 being completely saturated with hydrocarbons to such an extent that the hydrocarbons pass into the surroundings via the tank venting line 10. This is to be prevented under all circumstances. For this reason, the control device 11 is operative to activates the internal combustion engine 2 during electric operation of the hybrid vehicle as a function of a charge state of the filter device 6. As a result, the hydrocarbons are scavenged into the intake section 3 and are fed from the filter material 8 to combustion.

According to the invention, an operating strategy is provided in which the refueling emissions are scavenged from the filter device 6 promptly after a refueling process by a forced start of the internal combustion engine 2. The forced start of the internal combustion engine 2 is carried out whenever the hybrid vehicle is or could be driven in a purely electric mode. The forced start of the internal combustion engine 2 is carried out even though the fuel tank 7 is not completely filled with fuel.

A refueling process may be detected by a change in a filling level sensor signal or by detecting a release of a tank valve on vehicles with a pressurized tank. If a refueling process is detected, a corresponding signal is transmitted to a control unit that is used for the operating strategy according to the invention.

The operating strategy of the invention advantageously provides the maximum absorption capability of hydrocarbons of the filter device 6 promptly after refueling. This is particularly advantageous for motor vehicles operated in the United States and in which the refueling gases are fed into the filter device 6. As a result, undesired escaping of hydrocarbons into the environment or surroundings reliably is prevented. In this context, the invention intentionally accepts a small disadvantage in the form of slightly increased fuel consumption as a result of the forced start of the internal combustion engine 2 to achieve the more important assurance of avoiding a release of hydrocarbons into the environment.

The operating strategy of the invention keeps a low charging of the filter device 6, in particular of an activated carbon filter in the filter device 6. As a result, compliance with legal regulations, in particular in the United States, is simplified. Furthermore, the occurrence of an undesired fuel smell in the motor vehicle can be prevented.

The operating strategy of the invention can be expanded by carrying out the forced start, or an additional forced start, of the internal combustion engine 2 after fixed time intervals, for example after a week, or as a function of the filling level of the filter device 6, such as when an imminent breakdown of an activated carbon filter is detected.

The scavenging effect can be improved for regenerating the activated carbon filter of the filter device 6 during travel in an internal-combustion-engine mode by using a scavenging pump, or by using a venturi nozzle in the case of turbocharged engines. The operating strategy according to the invention makes it possible to use simplified pressurized tank systems or to dispense entirely with pressurized tank systems.

What is claimed is:

1. A method for operating a hybrid vehicle having an internal combustion engine supplied with fuel from a fuel tank and having a regeneratable filter device for taking up fuel vapors from the fuel tank, the hybrid vehicle further having a control unit for implementing an operating strategy for controlling when the hybrid vehicle will be operated in an electric mode and when the internal combustion engine will be operated, the method comprising:
    sensing completion of a partial or complete refilling of the fuel tank;
    transmitting a completion of refueling signal to the control unit upon sensing the completion of a partial or complete refilling of the fuel tank;
    operating the control unit for carrying out a forced start of the internal combustion engine promptly upon receipt of completion of refueling signal that is indicative of the partial or complete refilling of the fuel tank; and
    operating at least one valve for regenerating the filter device after carrying out the forced start of the internal combustion engine.

2. The method of claim 1, further comprising activating at least one of a scavenging pump and a venturi nozzle during a forced start of the internal combustion engine to improve a scavenging effect.

3. The method of claim 1, wherein the hybrid vehicle is a plug-in hybrid vehicle or a motor vehicle having a start/stop device.

4. The method of claim 1, wherein the fuel tank is a pressurized tank.

5. The method of claim 1, further comprising carrying out additional forced starts of the internal combustion engine to regenerate the filter device at fixed time intervals or as a function of a state of the filter device.

6. The method of claim 1, wherein the step of sensing a partial or complete refilling of the fuel tank comprises monitoring a tank closure of the fuel tank and carrying out the forced start of the internal combustion engine after the monitoring of the tank closure of the fuel tank senses the partial or complete refilling of the fuel tank.

7. The method of claim 1, wherein the step of sensing a partial or complete refilling of the fuel tank comprises monitoring a filling level sensor signal of the fuel tank and carrying out the forced start of the internal combustion engine after the monitoring of the filling level sensor signal of the fuel tank senses the partial or complete refilling of the fuel tank.

8. The method of claim 1, further comprising turning off the internal combustion engine and operating the hybrid vehicle in a purely electric mode after completing the regenerating of the filter device.

9. A method for operating a hybrid vehicle having an internal combustion engine supplied with fuel from a fuel tank and having a regeneratable filter device for taking up fuel vapors from the fuel tank, the method comprising:
  sensing operating conditions appropriate for operating the hybrid vehicle in a purely electric mode and operating conditions that require operation of the internal combustion engine;
  implementing an operating strategy for the hybrid vehicle in the purely electric mode or with operation of the internal combustion engine in response to the sensing of the operating conditions;
  sensing a charge state of the filter device;
  starting the internal combustion engine and regenerating the filter device in response to a sensed specified charge state of the filter device despite conditions appropriate for operating the hybrid vehicle in a purely electric mode;
  sensing a partial or complete refilling of the fuel tank;
  carrying out a forced start of the internal combustion engine promptly after the partial or complete refilling of the fuel tank despite existence of sensed conditions appropriate for operating the vehicle in the purely electric mode and despite a sensed charge state of the filter device that does not require regeneration;
  operating at least one valve for regenerating the filter device after carrying out the forced start of the internal combustion engine; and
  returning to the operating strategy for the hybrid vehicle based on the sensed operating conditions after completing the regenerating of the filter device.

10. The method of claim 9, wherein the step of sensing a partial or complete refilling of the fuel tank comprises monitoring at least one of a tank closure and a filling level sensor signal of the fuel tank and carrying out the forced start of the internal combustion engine after the monitoring of the tank closure or the filling level sensor signal of the fuel tank senses the partial or complete refilling of the fuel tank.

* * * * *